United States Patent [19]

Keidel et al.

[11] Patent Number: 4,894,070
[45] Date of Patent: Jan. 16, 1990

[54] FILTRATION OF FLUID MEDIA

[75] Inventors: Wolfram Keidel; Wilhelm Barlag; Rolf Loos, all of Borken, Fed. Rep. of Germany

[73] Assignee: Foseco International Limited, Birmingham, England

[21] Appl. No.: 269,826

[22] Filed: Nov. 10, 1988

[30] Foreign Application Priority Data

Nov. 13, 1987 [DE] Fed. Rep. of Germany ....... 8715130

[51] Int. Cl.⁴ .................... B01D 29/32; B01D 46/24
[52] U.S. Cl. ............................................ 55/96; 55/97; 55/302; 55/523; 210/510.1
[58] Field of Search ............ 55/523, 96, 97, 302; 285/55, 374, 399, 417, 915; 210/510.1

[56] References Cited

U.S. PATENT DOCUMENTS

| | | | |
|---|---|---|---|
| 474,006 | 5/1892 | Fryer | 285/399 X |
| 1,302,412 | 4/1919 | Murray | 285/417 X |
| 1,903,315 | 4/1933 | Priebe | 285/399 X |
| 2,337,584 | 12/1943 | Baker | 285/399 X |
| 2,615,235 | 10/1952 | Hadley | 285/417 X |
| 2,825,587 | 3/1958 | Barta et al. | 285/399 X |
| 2,967,067 | 1/1961 | Singer | 285/399 X |
| 3,436,898 | 4/1969 | Kaess et al. | 55/523 X |
| 3,439,941 | 4/1969 | Nicol | 285/417 X |
| 3,623,295 | 11/1971 | Shriner | 55/319 X |
| 3,782,450 | 1/1974 | Swozil | 285/915 X |

FOREIGN PATENT DOCUMENTS

| | | | |
|---|---|---|---|
| 0124863 | 11/1984 | European Pat. Off. | 55/523 |
| 1030776 | 5/1958 | Fed. Rep. of Germany | 210/510.1 |
| 55-119412 | 9/1980 | Japan | 55/523 |
| 55-137022 | 10/1980 | Japan | 55/523 |
| 0700176 | 12/1979 | U.S.S.R. | 55/523 |

Primary Examiner—Robert Spitzer
Attorney, Agent, or Firm—Nixon & Vanderhye

[57] ABSTRACT

An elongate tubular porous ceramic filter for use in the filtration of fluid media, e.g. the filtration of particulate matter from hot gases, is formed from a plurality of shorter tubular portions (10, 11, 12, 13, 14, 15, 20, 21) adhered together by a high-temperature adhesive at bonding points (30, 31) to provide long filter tubes.

15 Claims, 1 Drawing Sheet

FILTRATION OF FLUID MEDIA

This invention relates to the filtration of fluid media and a filter for use therein.

More particularly, the invention relates to the filtration of hot fluid media e.g. filtration of hot gases at temperatures of up to 1600° C. or more.

One reason for filtering hot fluid media is to remove material which might otherwise harm the environment e.g. promote or contribute to atmospheric pollution e.g. coal gasification plants and incineration plants.

Another reason for filtering fluid media is to recover valuable materials such as, for example precious metal particles from high temperature processes e.g. in the smelting of gold, silver, platinum or the like; in the manufacture of chemical compounds or refractory oxides in order to render such processes more efficient. The filters used in these processes have generally been fabricated of a metal which is suitable for use at elevated temperatures. Generally the preferred metal has been a stainless steel or the like nickel containing high temperature resistant alloy. Unfortunately, such filters are extremely expensive to produce and the too frequent replacement thereof can render a manufacturing process uneconomic and labour intensive in terms of the periodic maintenance that is required. In processes where arduous operating conditions exist i.e. where the temperature exceeds about 900° C. and/or where the hot gases are corrosive, such metal filters may fail because of erosion and thus have an uneconomically short working life.

Reducing the working temperature of e.g. hot gas filtration processes to a lower level is not always practicable since there may be a risk of condensation products forming at the lower temperature employed. In certain cases a reduction in the process temperature may result in an unacceptable loss of energy which might otherwise have been recovered by heat exchangers for reuse.

To overcome the above disadvantages it has been proposed to use filters e.g. in tubular form, comprising a major proportion of fibrous material made by a vacuum-forming process from e.g. a slurry. However, this process whilst capable of forming relatively long filter tubes, the overall length is generally limited to 1.5 meters or less. In order to achieve optimum filter efficiency related to a given volume and surface area it is often the case that filters of greater overall length are required. This longer length has been achieved by mechanically mating two or more shorter lengths together and holding them together by a costly and complex supporting structure. Furthermore, the shaped but as yet unhardened filter, i.e. before the binder has set, has proven very difficult to handle particularly if the shape is more than 1 meter in length.

We have now found that the above disadvantages can be reduced using a tubular porous ceramic filter having an overall length of several meters and which will withstand higher operating temperatures and mechanical stress such as vibration without any costly or complex mechanical holding or supporting means other than that inherently provided by the filter chamber itself.

According to the present invention there is provided a method of forming a tubular porous ceramic filter which comprises ceramic fibre and a binder for use in the filtration of fluid media characterised in that an elongate tubular filter is formed from a plurality of shorter tubular portions bonded together by a high-temperature adhesive such that the inner and/or the outer joints are adapted in an over- and/or under-lapping arrangement in respect of each adjacent tubular portion.

According to another aspect of the present invention there is provided a method of forming a tubular porous ceramic filter which comprises ceramic fibre and a binder for use in the filtration of fluid media, characterised in that an elongate tubular filter is formed from a plurality of shorter tubular portions arranged one inside another, the portions being bonded together such that the joints and bond points of the tubular portions are axially displaced one to another. This arrangement has the benefit that joints and bond points of the inner and outer tubes are not coincident with each other.

According to a still further aspect of the present invention there is provided a method of separating particulate matter from fluid media comprising the step of filtering the media through a porous ceramic filter as hereinbefore defined.

A wide range of ceramic fibres may be used but examples of particularly suitable ceramic fibres are alumina fibres, alumino-silicate fibres containing alumina, silica and in some instances a minor proportion of zirconia. The amount of ceramic fibre may be from 35 to 95% by weight, preferably 55 to 85% by weight.

The binder used may be organic, inorganic or a mixture of both of these types. The amount of binder used will vary according to its source but in the case of inorganic binders 5 to 35% by weight is satisfactory, preferably 10 to 30% by weight. An organic binder if used may be up to 25% by weight, preferably up to 15% by weight.

The inorganic binder may be any of those known for their suitability for bonding ceramic fibres but preferably the binder employed comprises at least one of alumina sol and silica sol.

Similarly, the organic binder may be any suitable material such as natural resins, synthetic resins or starch the latter being particularly preferred.

Preferably the tubular portions forming the porous ceramic filter according to the present invention are formed by mixing together ceramic fibre with at least one inorganic binder with sufficient water to form an aqueous slurry dewatering the slurry against a perforated mesh walled former having dimensions which correspond to those of the portion to be formed, applying a vacuum source to the interior of the former so as to create a pressure difference and thus cause the solid constituents of the slurry to be deposited against the mesh until the required wall thickness of the portion has been deposited, removing the former from the slurry and drying the portion to remove any residual water and if appropriate, after drying, firing the filter portion to effect a ceramic bond.

The portions thus formed may be from about 200 mm up to about 500 mm or more in length and these portions are assembled together in different ways to produce long self-supporting filter tubes several meters in length. In one case single tubes are joined together by means of a hugh temperature adhesive located between the jointing surfaces. The joint may be reinforced by means of a smaller outer tube portion which is adhesively bonded along its length e.g. equidistantly over the zone of the joint. In another case the joints are arranged in such a way that one tube portion fits inside another the whole zone of contact being coated with a layer of adhesive. In another embodiment a filter tube is formed from a plurality of inner and outer tube portions which are arranged one inside the other such that points of adhesion of the individual tube portions are axially displaced one to another.

The adhesives used are those which are suitable for bonding ceramic fibre containing articles together and can also withstand high temperatures. These adhesives possess a high dynamic strength, which is of significance particularly when cleaning the filter. The filters according to the invention can reach lengths in the order of 8 meters and they are usable at temperatures of up to 1600° C. or more.

It has also been found that the addition to the aqueous slurry of a minor proportion of a flocculating agent such as for example of a cationic starch aids the distribution of the binder during manufacture of the filter which in turn enhances the final mechanical strength of the filter.

Optionally, the aqueous slurry may additionally contain a minor proportion of a particulate filler material such as a refractory oxide such as alumina, magnesia, silica, titania, zirconia or a refractory silicate e.g. an alumino-silicate, which has been found to increase the refractoriness of the filter and also optimise its porosity.

The porosity of the filter may be between relatively broad limits e.g. between 50 to 95%, more typically between 75 to 85% to encompass its several different possible uses.

The permeability of the filter or in other terms the resistance to the flow of air through the material is also an important factor. Filters whose resistance is in the range from about $1 \times 10^5$ to about $1 \times 10^8$ Nm$^{-4}$s. are satisfactory for use in connection with filtering particulate matter from fluid media including particles from hot gases. More typically resistance values from about $5 \times 10^5$ to $5 \times 10^6$ Nm$^{-4}$s. provide particularly efficient filters.

A filter according to the present invention is capable of removing particles from fluid media of 0.5 microns or greater.

Typically, in use, the filters will be cleaned at frequent intervals, which may be as often as every 10 minutes. Preferably, the cleaning is effected by a reverse pulse method using compressed air.

Furthermore, filters of the present invention are not adversely affected by corrosive fluid media of an acidic or alkaline nature, even at elevated temperatures of up to 1600° C. or more unlike metal filters which are readily corroded and subject to erosion in such conditions. In addition the filters are not oxidised by oxygen containing fluid media.

Other advantages of filters according to the present invention include their resistance to thermal shock, their low overall weight, their ease of manufacture and the fact that they are self-supporting.

A further benefit which accrues from the use of a filter according to the invention relates to the purity of the hot gas of a given process after filtration in that it is possible to reuse the hot gas in the same or another process without further treatment of the gas thereby achieving substantial energy savings.

Filters according to this invention exhibit high efficiency in conjunction with a minimum pressure drop across the body of the filter following long periods of use of filters which may be up to approximately 4000 hours.

The invention is more particularly described with reference to the accompanying drawings in which.

Figure 1:
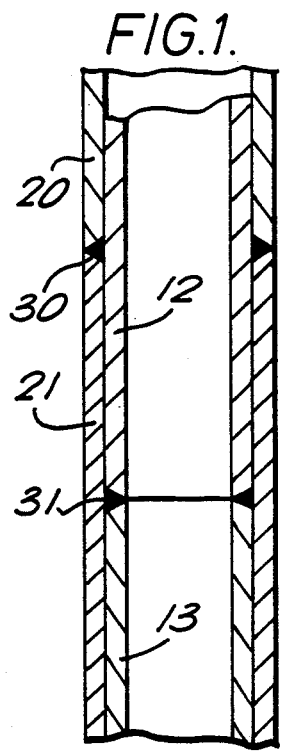
FIG. 1 is a part longitudinal section of one embodiment of the invention comprising a plurality of inner and outer tubular portions.

Referring to FIG. 1, a tubular ceramic fibre filter according to the invention consists of two tubes. The inner tube consists of a plurality of individual filter tube portions, two of which are shown as 12 and 13. The filter tube portions 12 and 13 are jointed together at 31 by means of a suitable high temperature adhesive.

The outer tube is formed of a plurality of slightly larger diameter tube portions 20 and 21 two such filter tube portions are joined together by means of a high temperature adhesive at 30.

It can be seen that the two bond points 30 and 31 are displaced in an axial direction with respect of one to the other.

Figure 2:
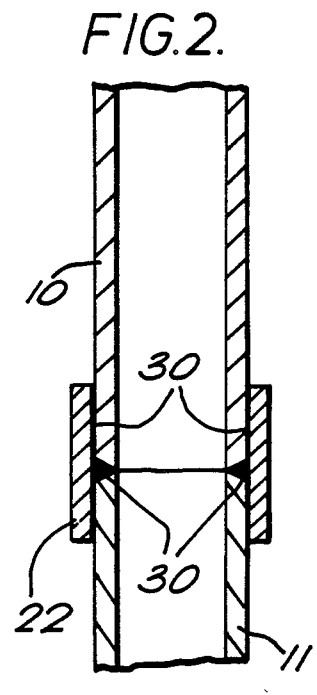
FIG. 2, FIG. 3a and FIG. 3b are each part longitudinal sections of another embodiment of the invention.

FIG. 2 shows a single tube structure having a plurality of filter tube portions joined one with the other, wherein one portion is designated 10 and the other 11. The adhesive on the front faces of the two filter tube portions 10 and 11 is surrounded by one tube portion 22, where not only the contact points of the two tube pieces 10 and 11, but the whole inside of the tubular portion 22 is provided with adhesive.

Figure 3A:
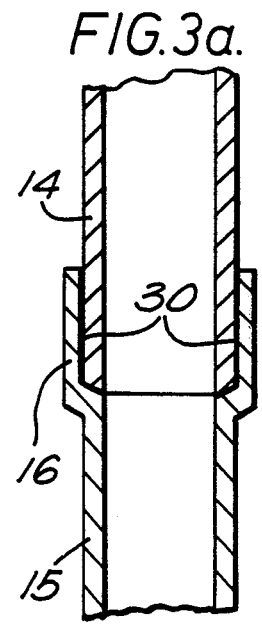
Figure 3B:
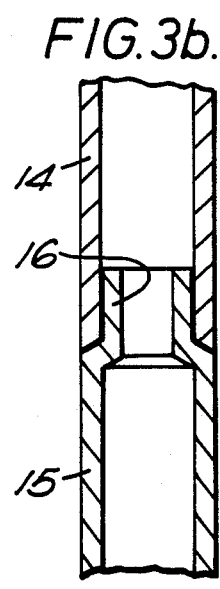

The embodiments shown in FIGS. 3a and 3b are essentially according to that in FIG. 2, with the exception that the lower filter tube portion 15 is formed with a wider tubular extension 16, which serves to receive a further filter tube portion 14. The interior (FIG. 3a) and the exterior (FIG. 3b) of the extension 16 and also the contact points of the filter tube portion 14 are provided with adhesive. In FIG. 3b the extension 16 is narrower than the tube 15 and serves to receive a further filter tube 14.

The embodiments shown in FIGS. 3a and 3b can also be used rotated through 180° for reasons of flow characteristics and the nature of the dust accumulation.

Figure 5:
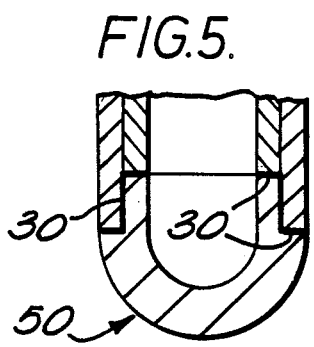
FIG. 4 and FIG. 5 are each part longitudinal sections of a filter unit of the invention showing the detail of the upper and lower ends.
Figure 4:
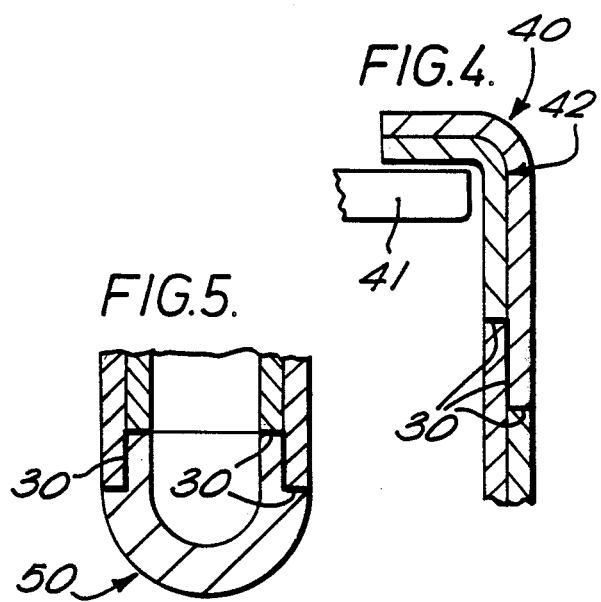

The end parts of the formed filter can be designed as shown in FIG. 4 and FIG. 5. The upper fixing 40, both of the inner and also of the outer filter tubes reveal a flange-like portion for fixing the tube in the filter chamber.

In the region of the fixing plate 41 the filter material is specially strengthened by means of an addition treatment with a ceramic binder. In the region 42 the inner and outer tubes are fastened additionally at different lengths. This increases the strength in the case of horizontally arising stresses, which appear particularly during cleaning of the filters. The opposite, free end is formed with a dome-shaped part 50 (FIG. 5) which is attached to the inner and the outer tubes also be means of a high temperature adhesive.

In the embodiments illustrated in FIG. 2, FIG. 3a or FIG. 3b the dome-shaped endpiece is fixed in accordance with the means shown in FIG. 5 or in FIG. 2.

The part 40 (FIG. 4) may be formed in one piece in which case it has regions with differing outside diameter so that it is suitable for joining with the inner and outer tubes.

The following example will serve to illustrate the invention still further:

EXAMPLE

The tubular components of a porous ceramic fibre filter were made from an aqueous slurry comprising 74 parts alumino-silicate fibre (available commercially under the trade name "Fiberfrax"), 19.5 parts silica sol, (available commercially under the trade name "Syton") and 6.5 parts of cationic starch (available commercially under the trade name ("Perfectamyl PLV"). The solids content of the slurry was 2% by weight. A perforated mesh walled former having dimensions of 300 mm in length and 100 mm diameter for the inner tube, and another former also of 300 mm in length but 120 mm diameter for the outer tubes were each immersed in the slurry for five seconds during which time a vacuum was applied to the inside of the formers until a layer 10 mm thick had been deposited on to each former of the solid constituents of the slurry. On removal from the formers the 'green' filter tube portions were dried at 180° C. for 4 hours.

After drying, the above components were assembled into a 1.8 meter long filter tube in the manner described previously in accordance with FIG. 1, using six tubes joined together by high temperature adhesive. The finally assembled tube also features the components illustrated in FIG. 4 and FIG. 5.

We claim:

1. A method of filtering particulate matter from a fluid media comprising the steps of providing an elongated tubular porous ceramic filter, forming said filter by forming a plurality of tubular portions formed of ceramic fiber and a binder in two different diameters, overlapping the tubular portions of different diameters one with the other with a first set thereof received within a second set thereof, and bonding the sets of tubular portions in end-to-end relation respectively, using an adhesive at bonding points therebetween such that the end-to-end bonding points of the two different sets of tubular portions are axially offset one from the other, and passing the media through the elongated tubular porous ceramic filter so that fluid passes through the filter body, but the particulate matter does not.

2. A method as recited in claim 1 comprising the further step of periodically cleaning the filter by effecting a reverse pulse of compressed air therethrough.

3. A method as recited in claim 1 wherein the fluid media is an acidic or alkaline gas having a temperature of about 1600° C. or more; and comprising the further step of reusing the hot gas in a constructive process after filtration.

4. An elongated tubular filter comprising:

a plurality of porous ceramic material tubular portions, each tubular portion comprising ceramic fiber and a binder;

said plurality of tubular portions comprising a first plurality having a first cross-sectional area, and further comprising a second plurality having a second cross-sectional area greater than said first cross-sectional area, so that said second portions are adapted to receive said first portions therein; and means for holding said first and second pluralities of said tubular portions in axially aligned end-to-end relation, respectively, to form a composite elongated tubular filter, comprising means defining an overlapping configuration of the portions including said second portions receiving said first portions, and an adhesive at bonding points associated with said overlapping configuration including between the ends of said axially aligned first and second pluralities of said tubular portions, respectively, and wherein the bonding points between the portions of said first plurality are off-set axially with respect to the bonding points between said second plurality.

5. A filter as recited in claim 4 wherein said ceramic fiber is selected from the group consisting of alumina fibers, alumino-silicate fibers, and mixtures of alumina and alumino-silicate fibers, said fibers present in an amount from 35–95% by weight.

6. A filter as recited in claim 5 wherein said binder is a colloidal oxide hydrosol.

7. A filter as recited in claim 4 wherein said tubular portions are vacuum formed from an aqueous slurry of ceramic fiber and binder.

8. A filter as recited in claim 7 wherein said aqueous slurry further includes a flocculating agent.

9. A filter as recited in claim 8 wherein said flocculating agent is a cationic starch.

10. A filter as recited in claim 4 wherein said porous ceramic tubular portions have a porosity of between 50–95%.

11. A filter as recited in claim 10 wherein the resistance to flow of air through the filter is in the range of from about $1 \times 10^5$ to about $1 \times 10^8$ $Nm^{-4}s$.

12. A filter as recited in claim 4 wherein the resistance to flow of air through the filter is in the range of from about $1 \times 10^5$ to about $1 \times 10^8$ $Nm^{-4}s$.

13. A filter as recited in claim 4 wherein said binder is a colloidal oxide hydrosol.

14. A filter as recited in claim 4 wherein said holding means consists of said overlapping second and first portions and said adhesive.

15. A filter as recited in claim 4 wherein said filter is comprised of substantially continuously extending outer and inner tubular portions defining a dual thickness filter at substantially each axial position therealong.

* * * * *